United States Patent [19]

Struger et al.

[11] 3,813,649

[45] May 28, 1974

[54] CONTROLLER PROGRAM EDITOR

[75] Inventors: Odo J. Struger, Mayfield Heights; Valdis Grants, Lyndhurst; William W. Searcy, Richmond Heights, all of Ohio

[73] Assignee: Allen Bradley Company, Milwaukee, Wis.

[22] Filed: Sept. 1, 1972

[21] Appl. No.: 285,381

[52] U.S. Cl. .......................................... 340/172.5
[51] Int. Cl. ............................................ G06f 9/00
[58] Field of Search .................................. 340/172.5

[56] References Cited
UNITED STATES PATENTS

| | | | |
|---|---|---|---|
| 3,372,381 | 3/1968 | Raspanti | 340/172.5 |
| 3,439,343 | 4/1969 | Stahle | 340/172.5 |
| 3,624,616 | 11/1971 | Patel | 340/172.5 |
| 3,646,522 | 2/1972 | Furman et al. | 340/172.5 |
| 3,699,528 | 10/1972 | Carlson | 340/172.5 |

*Primary Examiner*—Gareth D. Shaw
*Attorney, Agent, or Firm*—Barry E. Sammons

[57] ABSTRACT

A program loader for a programmable controller includes a read-write memory into which an initial program is loaded, tested and edited. The programmable controller is operated and the condition of an input or output device which it controls is monitored each time an instruction containing the device's I/O address is read from the read-write memory. When the loader is operated in a SEARCH mode, the program is read in sequence from the read-write memory and each instruction is compared with an instruction manually inserted at an input circuit. When operated in a GAP or UNGAP mode, an empty line, or gap is either created or closed in the stored program by shifting a set of instructions one line in the read-write memory. The GAP and UNGAP operations are performed by sequentially reading out each instruction, and replacing it with the adjacent temporarily stored instruction.

10 Claims, 5 Drawing Figures

CONTROLLER PROGRAM EDITOR

BACKGROUND OF THE INVENTION

The field of the invention is programmable controllers and particularly means for loading and editing programs for controllers such as that disclosed in the copending patent application Ser. No. 173,923, filed Apr. 27, 1971, and entitled "Programmable Matrix Controller."

Controllers such as that described in the above cited application perform complex control jobs in accordance with a stored program. The program is a set of instructions which directs the controller to examine the condition of various input devices such as motor starters, indicator lights, control valves and solenoids, compare these conditions to the conditions specified in the stored program, and accordingly, direct the controller to energize or deenergize selected output devices. The programs are derived from either a "ladder diagram," a logic diagram, or a set of Boolean expressions which are converted into machine language and entered into the memory unit of the programmable controller.

Although a suitable program may be developed and loaded directly into the controller, in practice such initial programs must first be used on the job site to correct unforeseen problems which inevitably occur. To this end, program loaders such as that disclosed in the copending patent application Ser. No. 179,982, filed Sept. 13, 1971, and entitled "Controller Programmer" have been developed. The loader disclosed in this copending application includes a memory into which the initial program is loaded and used to operate a controller. Changes are made to the program by deleting incorrect instructions and adding new instructions, until the final program is obtained. The program is then transferred to a read-only memory which is installed in the programmable controller.

SUMMARY OF THE INVENTION

The present invention relates to a program loader for a programmable controller, and more specifically, to a loader which provides increased program editing capability. The loader includes: a read-write memory; a first temporary storage connected to receive and store an instruction read from the memory; a second temporary storage connected to receive and store an instruction from the first temporary storage and connected to generate the stored instruction to the read-write memory upon command; and an address counter connected to the read-write memory to address selected instructions stored therein. A pair of instructions may be read out of memory, stored in the temporary storages, and reloaded into the memory at new memory locations. Program instructions can thus be shifted to different memory locations, or addresses, without deleting any instructions.

A general object of the invention is to provide additional program editing capability to a program loader such as that disclosed in the above cited copending patent application Ser. No. 179,982. An initial program is loaded into the read-write memory and the controller is operated in accordance with the instructions in this program. Corrections are typically made either by deleting instructions or by inserting additional instructions at various points in the program. Where the insertion of an instruction is required, this has been accomplished in the past by deleting all those instructions which follow, adding the new instruction and then rewriting the deleted instructions. If the insertion is made near the beginning of the program, the task of rewriting the deleted instructions is quite burdensome. The present invention includes a control circuit which automatically operates the elements of the loader to create spaces, or gaps, at any desired memory address. Or, when gaps are created in the stored program due to the deletion of instructions, these gaps may be automatically closed to conserve memory space. The latter operation is particularly advantageous if the program is ultimately to be transferred from the read-write memory to a read-only memory.

Another general object of the invention is to facilitate editing of an initial controller program. To this end, the loader includes a comparator circuit which has a first set of input terminals connected to receive the instructions read out of the read-write memory and a second set of input terminals connected to receive an instruction manually inserted at an input circuit. When operated in its SEARCH mode, the memory location of a specified instruction is determined by sequencing through the stored program and comparing each instruction therein with that specified. When located, the memory address of the instruction is indicated on a memory address display.

Another object of the invention is to monitor input or output devices connected to the programmable controller. Each input or output device is identified by an I/O address contained in each program instruction. When operated in a MONITOR mode, the I/O address of the device to be monitored is inserted at the input circuit and the loader with attached controller sequence through the program, comparing the I/O address of each instruction read from memory with the I/O address stored in the input circuit. Each time an instruction containing the specified I/O address is encountered, the condition of the designated input or output device is monitored by sensing the state of a logic input bus in the programmable controller. The sensed condition (open or closed, energized or deenergized) is indicated visually.

The foregoing and other objects and advantages of the invention will appear from the following description. In the description reference is made to the accompanying drawings which form a part hereof, and in which there is shown by way of illustration a preferred embodiment of the invention. Such description does not necessarily represent the full scope of the invention, and reference is made to the claims herein for interpreting the breadth of the invention.

BRIEF DESCRIPTION OF THE DRAWINGS

FIG. 4 is an electrical schematic diagram of that portion of the central control which relates to the SEARCH mode of operation.

DESCRIPTION OF THE PREFERRED EMBODIMENT

There are a number of commercially available programmable controllers which operate to examine the condition of various input devices, compare these conditions to the conditions specified in the instructions of a stored program, and accordingly, energize or deenergize selected output devices. These controllers vary in the number of input and output devices they can control and in the number of operations which they can be directed to perform. Despite these many variations, all controllers include a stored program which is comprised of a series of instructions that are repeatedly read out of memory in sequence. Each instruction includes an operation code which determines the function to be performed by the controller and an I/O address code which determines the particular input or output device concerned.

A major distinction between the various commercially available programmable controllers is the type of memory units which they use. A first type of controller uses what is commonly referred to as a read-only memory to store the program. Such memories are relatively inexpensive, are very reliable, and require a minimal of associated supporting circuitry. A second type of controller includes what is commonly referred to as a read-write memory. Whereas, the program is permanently "burned" into a read-only memory, changes can be readily made to programs stored in read-write memories. Such changes are performed by clearing the program instruction from the memory and rewriting a new instruction in its place. Although it is more expensive, the read-write memory provides greater flexibility in programming the controller because corrective changes can be easily made.

The present invention is a program loader with editing capabilities that greatly facilitate the programming of either a read-only or a read-write controller memory. In the above cited copending application Ser. No. 179,982, a loader is disclosed which includes a read-write memory into which an initial program is loaded and edited. Unlike the preferred embodiment of the loader described in this copending application, the present loader does not include its own memory, but instead, makes use of a read-write memory which is located physically within the controller cabinet. Therefore, although the read-write memory is part of the program loader when the loader is electrically connected to the programmable controller, an additional, or separate read-write memory for the loader is not required. After the program is developed using the program loader, the read-write memory may be left in the controller, or the program may be transferred to a read-only memory which is installed in the controller. The description which follows is made without regard to the physical location of the various loader elements, however, it should be apparent to those skilled in the art that the physical interface between the programmable controller and the program loader may be at any one of a number of locations.

Figure 1:
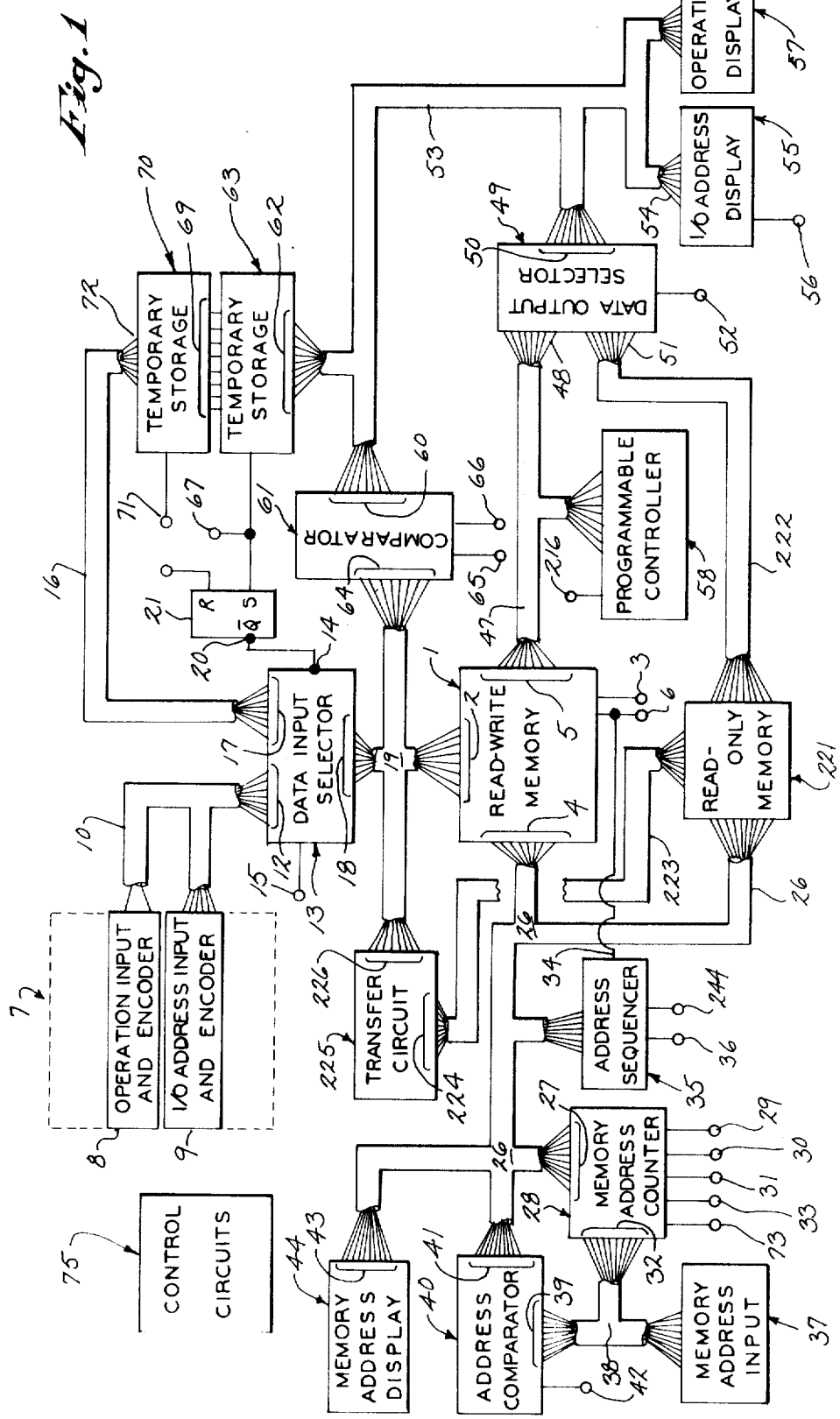
FIG. 1 is an electrical block diagram of the program loader and programmable controller.

Referring to FIG. 1, the program loader includes a ferrite core, read-write memory 1 which has a capacity to store 1,024 eight-bit words. An eight-bit word is written, or stored, in the read-write memory 1 by applying it in parallel to a set of eight data input terminals 2 and by applying a logic high voltage to a memory R/W select terminal 3. The location, or memory address at which the word is stored is determined by a 10-bit memory address code applied to a set of address terminals 4. On the other hand, a word stored in the memory 1 is read out at a set of data output terminals 5 when it is both addressed and when a logic low voltage is applied to the memory R/W select terminal 3. Both the read and write functions are initiated by a clock pulse applied to a memory cycle initiate terminal 6.

The controller program stored in the read-write memory 1 is comprised of a series of one-word instructions stored at successive memory addresses. The program is manually loaded into the memory 1, one instruction at a time, by means of an input circuit 7. The input circuit 7 includes a set of four pushbuttons (not shown in the drawings) with an associated encoder circuit 8, and a set of three I/O address leverwheels with associated encoder circuit 9. The leverwheels (not shown in the drawings) are commercially available electromechanical devices which each generate a three-bit binary number that corresponds to a manually selected octal number. A two-bit operation code generated from the pushbutton encoder 8, and a six-bit address from the leverwheel encoder 9 is applied to a cable 10. The resulting eight-bit instruction is applied to a first set of input terminals 12 on a data input selector circuit 13. The data input selector 13 is comprised of four, cascaded, dual two-line-to-one-line data selectors available from Texas Instruments, Inc. as integrated circuit number SN74153. Each data selector is a commercially available integrated circuit which includes a data select terminal 14 and a clear terminal 15. A second data cable 16 connects to a second set of input terminals 17 on the data input selector 13 and a set of either output terminals 18 connect it to a memory data input bus 19. When a logic high voltage is applied to the data select terminal 14, the eight-bit instruction generated on the cable 10 is applied to the memory data input bus 19. Data selection is accomplished by the connection of the data select terminal 14 to a $\overline{Q}$ output terminal 20 on an R-S flip-flop 21. Flip-flop 21 is a commercially available bi-stable circuit which either generates a logic low voltage at the $\overline{Q}$ output terminal 20 when it is set by a logic low voltage applied to an S input terminal 22, or generates a logic high voltage at the $\overline{Q}$ output terminal 20 when it is reset by a logic low voltage applied to an R input terminal 23.

An instruction is manually loaded into the read-write memory 1 by first resetting the flip-flop 21 to select data on the cable 10 from the input circuit 7. A logic high voltage is applied to the memory R/W select terminal 3, and a clock pulse is applied to the memory cycle initiate terminal 6. An eight-bit instruction at the input circuit 7 is conducted through the cable 10, through the data input selector 13, through the memory data input bus 19 and is loaded, or "written" on an addressed line in the read-write memory 1. Subsequent instructions in the program are loaded in similar fashion, and by altering the memory address code applied to the memory address terminals 4, these instructions are loaded on succeeding lines in the memory 1.

The memory address terminals 4 connect to corresponding leads in a memory address cable 26 and the memory address cable 26 in turn connects to a set of 10 output terminals 27 on a memory address counter 28. The memory address counter 28 is comprised of three, cascaded, synchronous four-bit up/down binary counters, each of which is available commercially in integrated circuit form from Texas Instruments, Inc. as number SN74193. The 10 least significant digits generated by this counter appear at the output terminals 27. The binary number generated at the output terminals 27 is incremented one count by applying a logic low voltage pulse to an up-count input terminal 29, or it is decremented one count by the application of a logic low voltage pulse to a down-count input terminal 30. Also, the counter output may be set to zero by the application of a logic high voltage pulse to a data clear input terminal 31, or a memory address may be entered directly into the counter 28 through a set of 10 input terminals 32. Such an applied memory address is entered directly when a logic low voltage is applied to a read terminal 33.

Associated with the read-write memory 1 and located within the programmable controller is an address sequencer 35. When activated by the application of a logic low voltage to a clock enable terminal 36, the address sequencer automatically operates the read-write memory 1 to read out in sequence each word stored therein at a rate of 100,000 words per second. The address sequencer 35 connects to the memory address terminals 4 through the memory address cable 26 and to the cycle initiate terminal 6 through a lead 34. When enabled, the program stored in the read-write memory 1 is read out at the normal operating rate to run the programmable controller.

A selected instruction stored in the read-write memory 1 is addressed directly by manually selected its memory address at a memory address input circuit 37. The memory address input circuit 37 is comprised of four leverwheels connected through appropriate buffer circuits to a memory address input cable 38. The leverwheels (not shown in the drawings) are commercially available electro-mechanical devices which each generate a three-bit binary number in response to the octal number which is manually selected. The 10 least significant digits of the resulting 12-bit binary coded word are applied through the cable 38 to the memory address counter 28. When a pushbutton (not shown in the drawings) is depressed, a logic high voltage is applied to the address counter read terminal 33 and the selected address is entered into the counter 28.

The cable 38 also connects to a first set of input terminals 39 on an address comparator 40. The address comparator 40 is comprised of three, cascade connected, commercially available four-bit magnitude comparators available from Signetics as number 8242. The address comparator 40 includes a second set of input terminals 41 which are connected to corresponding leads in the memory address cable 26. When the memory address generated by the memory address counter 28 is identical to the memory address generated by the memory address input circuit 37, a logic low voltage is generated at an address comparator output terminal 42. The purpose of this comparison will be more fully explained below when the UNGAP mode of operation is described.

The memory address generated on the memory address cable 26 is applied to a set of 10 input terminals 43 on a memory address display 44. The memory address display 44 includes four, cascaded, BCD-to-seven-segment decoder/drivers, each connected to the input terminals 43, and each connected to drive an indicator (not shown in the drawings). Each indicator is a light emitting diode device which selectively illuminates the numbers zero through seven.

An instruction stored in the read-write memory 1 is addressed in one of three manners. First, when running the controller at normal operating speeds, the address sequencer 35 repeatedly cycles through the program, reading out each instruction in sequence at a relatively high rate. Second, a memory address may be manually selected at the memory address input 37 and applied through the memory address counter 28 to address one instruction stored in the read-write memory 1. And finally, the memory address counter 28 may be operated through its up-count and down-count terminals 29 and 30 to automatically address instructions during certain editing functions which will be described more fully hereinafter.

Instructions read out at the read-write memory output terminals 5 are applied through a cable 47 to a first set of input terminals 48 on a data output selector 49. The data output selector 49 is comprised of two, commercially available, cascade connected, two-line-to-one-line data selectors available from Texas Instruments, Inc. as number SN74157 which either conduct the eight-bit signal applied to the first set of input terminals 48 to a set of eight output terminals 50, or conduct an eight-bit signal applied to a second set of input terminals 51 to the output terminals 50. The selection is determined by the logic state of a voltage applied to a data select terminal 52. The data selector output terminals 50 connect to respective leads in a memory data output bus 53, which in turn connect to an I/O address display circuit 55 and an operation display circuit 57. The address display circuit 55 includes three, cascaded, BCD-to-seven-segment decoder/drivers connected to a set of three light emitting diode (LED) indicators. The six-bit address code in each instruction generated on the bus 53 is applied to a set of six input terminals 54, and one of the octal numbers 0–77 is displayed on two of the LED indicators. A "1" (for I/O addresses $101_8$ to $176_8$) is displayed on the third LED indicator when a logic high voltage is applied to an address expansion input terminal 56. The address expansion input terminal 56 connects to an expansion bus (not shown in the drawings) in the programmable controller, and reference is made to the copending patent application Ser. No. 166,796 entitled "Programmable Controller Expansion Circuit" for a more detailed description of this connection. The two-bit operation code in each instruction generated on the memory data output bus 53 is applied to the operation display circuit 57 which energizes one of four indicators (not shown in the drawings).

The programmable controller is also connected to the outputs 5 of the read-write memory 1. More specifically, the operation decoder and address decoder therein are connected to the cable 47 to receive each instruction read from the memory 1. The operation of these circuits which are indicated by the block 58 in FIG. 1 are fully described in the above cited copending application Ser. No. 137,923.

The program loader thus far described operates to load the read-write memory 1, operate the controller 58 one instruction at a time, and to operate the controller 58 at its normal speed. In what is termed a READ/-WRITE mode, the program loader loads an instruction inserted at the input circuit 7 into the read/write memory 1 and automatically displays the stored instruction on the displays 55 and 57. The program is read out one instruction at a time to the programmable controller 58 in what is termed a RUN/STEP mode of operation. In this mode the address sequencer is disabled and instructions are read from the read-write memory 1 in response to pulses applied to the memory address counter up-count input terminal 29 and the cycle initiate terminal 6 from a manually operated pushbutton (not shown in the drawings). By thus stepping through the program, the operation of the programmable controller 58 can be observed and any errors in the program noted. Finally, the program loader is operated in a RUN mode in which the address sequencer 35 is enabled and the programmable controller 58 is operated at its normal rate of 100,000 instructions per second.

A limited amount of program editing can be performed with the structure thus far described. For example, if an instruction is to be changed, its memory address is entered through the memory address input circuit 37 into the memory address counter 28. A logic high voltage is applied to the memory R/W select terminal 3 on the read-write memory 1, and a logic low voltage is applied to the R input 23 on the R-S flip-flop 21 to select a new instruction from the input circuit 7. The I/O address of the new instruction is entered through the I/O address encoder circuit 9 and the appropriate operation code pushbutton is depressed. A logic low voltage pulse is generated to the memory cycle initiate terminal 6 and the new instruction is written onto the addressed line of the read-write memory 1.

Further editing capabilities are provided, however, by the connection of the leads in the memory data output bus 53 to a first set of input terminals 60 on a comparator circuit 61. The comparator circuit 61 is comprised of two, cascaded, commercially available four-bit magnitude comparators which are connected to compare an eight-bit instruction applied to its first input terminals 60 with an eight-bit instruction applied to a second set of comparator input terminals 64. The second instruction to be compared is generated by the input circuit 7 and is applied through the data input selector 13 and the memory data input bus 19. Thus, an instruction read from the read-write memory 1 may be compared with an instruction manually inserted at the input circuit 7. When identity is found, a logic low voltage is generated at a comparator output terminal 65. Additionally, the comparator circuit 61 includes an op-code disable terminal 66, and when a logic low voltage is applied to this terminal, comparison is made only between the six-bit address codes contained in the instructions applied to the comparator inputs 60 and 64. The comparator 61 is available commercially in integrated circuit form from Signetics as number 8242. The functions of the comparator 61 will become more apparent when the SEARCH and MONITOR modes of operation are described more fully below.

Additional editing capabilities are provided by the connection of the memory data output bus 53 to input terminals 62 on a first temporary storage 63. The first temporary storage 63 is a commercially available eight-bit bi-stable latch sold by the Texas Instruments Corporation (SN74100). It includes an enable terminal 67, which when driven to a logic high voltage operates to read an instruction on the memory data output bus 53 and when driven to a logic low voltage, store the instruction and generate it at a set of eight storage output terminals 68. The storage output terminals 68 in turn connect to a set of eight input terminals 69 on a second temporary storage 70. The second temporary storage 70 is identical to the first storage 63 and it operates to read and store the instruction stored in the first temporary storage 63 when a logic high voltage pulse is applied to its enable terminal 71. Such a stored instruction appears at a set of eight storage output terminals 72 which connect to the leads in the data cable 16.

The first and second temporary storages 63 and 70 operate in conjunction with the memory address counter 28 to transfer instructions stored in the read-write memory 1 from one memory location to another. Although instructions can thus be transferred to any desired memory address, the program loader is specifically designed to automatically shift a selected group of instructions one address in either direction. A one-line upward address shift is performed by a GAP operation and a one-line downward shift is performed by an UNGAP operation. Through a sequence of events which will be described in more detail below, the GAP operation is performed by first reading out the instruction contained on the line to be cleared, or gapped. Then in subsequent steps which occur automatically, the instruction is stored in the first temporary storage 63, zeros are written into the addressed line of the read-write memory 1, the stored instruction is transferred from the first to the second temporary storage 70, the memory address counter 28 is incremented by one count, and the instruction on the newly addressed line in the read-write memory 1 is read out to the first temporary storage 63 and replaced by the instruction stored in the second temporary storage 70. The cycle repeats automatically until each of the subsequent instructions has been shifted to the following line in the read-write memory 1. The GAP operation terminates when the memory address counter 28 reaches its maximum count and a logic high "carry" pulse is generated at a counter output terminal 73.

The UNGAP operation is a similar automatically performed address shift of a portion of the program. The memory address of the empty line, or gap, is manually inserted at the memory address input circuit 37 where it is applied to the input terminals 39 of the address comparator 41. In a sequence of events which occur automatically, the memory address counter 28 is set at its maximum count and operates to read out the word stored at the last memory location to the first temporary storage 63. In subsequent steps, zeros are written into the addressed line of the read-write memory 1, the instruction in the first temporary storage 63 is transferred to the second temporary storage 70, and the memory address counter 28 is decremented by one count to read out the next preceding instruction from the read-write memory 1 and replace it with the instruction in the second temporary storage 70. The cycle continues automatically until the memory address generated by the counter 28 corresponds to that applied to the first input terminals 39 of the address comparator 40. When this occurs, a logic low voltage is generated at the address comparator output terminal and the UNGAP operation terminates.

The sequence of events which occur in the SEARCH, the MONITOR, the GAP, and the UNGAP modes of operation are controlled by a control circuit indicated in FIG. 1 by the block 75. To avoid unnecessary complexity, the connections of the control circuit 75 are not shown in FIG. 1, but instead, are described below and shown in FIGS. 2-5. Also, a detailed description of the construction of portions of the control circuit 75 have not been made herein in order to avoid confusing the present disclosure with subject matter described and shown in the above cited copending program loader patent application Ser. No. 179,982. And finally, the control circuit 75 is shown and discussed below as a set of individual circuits, however, it will become apparent to those skilled in the art that a number of the circuit elements described in each of the circuits may actually be used in more than one mode of operation.

Figure 2:
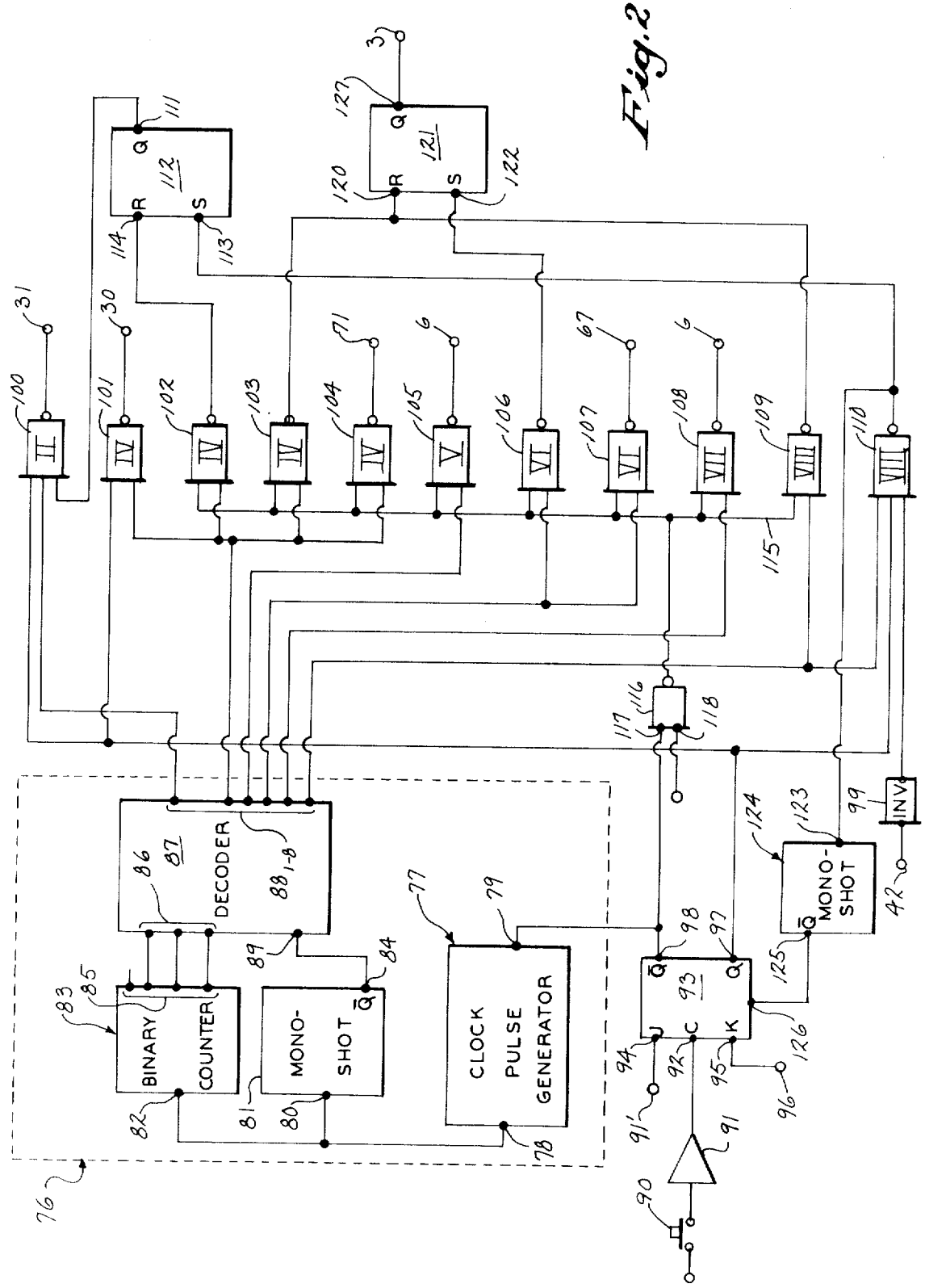
FIG. 2 is an electrical schematic diagram of that portion of the central control which is relevant to the CLOSE GAP mode of operation.

Referring to FIG. 2, that portion of the control circuit 75 relating to the UNGAP mode of operation includes an eight-phase clock pulse generator indicated by the dashed lines 76. The eight-phase clock 76 includes a 1 kilohertz clock pulse generator 77 which generates a series of logic high clock pulses at an output terminal 78 when a logic high voltage is applied to an enable terminal 79. The clock output terminal 78 connects to both an input terminal 80 on a monoshot circuit 81 and to an input terminal 82 on a four-bit binary counter 83. The monoshot circuit 81 is a commercially available integrated circuit which generates a logic low voltage pulse at a $\bar{Q}$ output terminal 84 when a logic high clock pulse is applied to its input terminal 80. Binary counter 83 is also a commercially available integrated circuit which counts the number of clock pulses applied to its input terminal 82 and generates this count in binary form at a set of four output termianls 85. The three most significant digits at the output terminals 85 are connected to a set of three input terminals 86 on a decoder circuit 87. The decoder circuit 87 is a commercially available integrated circuit, more commonly referred to as a three-line-to-eight-line decoder. It selectively generates a logic high voltage at one of eight output terminals $88_{1-8}$ in response to a logic low voltage applied to a strobe terminal 89 and a three-bit binary number applied to its input terminals 86.

When enabled by the application of a logic low voltage to the clock pulse generator enable terminal 79, binary counter 83 operates to count the generated pulses and the monoshot circuit 81 is clocked to generate a logic low voltage pulse to the strobe terminal 89 of the decoder circuit 87. Logic high output pulses are thus generated at successive decoder output terminals $88_{1-8}$. The clock pulse generator 77 continues to cycle the counter 83 until the logic low voltage is removed from the clock enable terminal 79.

The UNGAP operation is initiated by closing a manual pushbutton switch 90 connected through an appropriate buffer 91 to a clock terminal 92 on a J-K flip-flop 93. A J input terminal 94 on the flip-flop 93 connects to the positive supply terminal 91', and a K input terminal 95 connects to a negative supply terminal 96. The J-K flip-flop 93 is a commercially available integrated circuit which is bi-stable in either a set or reset state. It is set by the application of a positive to negative voltage transition at the clock terminal 92, and in this state it generates a logic high voltage at a Q output terminal 97 and a logic low voltage at a $\bar{Q}$ output terminal 98.

The $\bar{Q}$ output terminal 98 connects to the clock enable terminal 79.

The eight-phase clock 76 sequentially operates a set of 11 NAND gates 100-110 which in turn sequentially operate the elements of the loader shown in FIG. 1. The NAND gates 100-110 have been further identified with Roman Numerals which correspond with the clock output terminal $88_{1-8}$ to which they are attached. More specifically, an input terminal on the NAND gate 100 connects to the eight-phase clock pulse generator output terminal $88_2$, the NAND gates 101-104 connect to the output terminal $88_4$, the NAND gate 105 connects to the output terminal $88_5$, the NAND gate 105 connects to the output terminal $88_5$, the NAND gates 106 and 107 connect to the output terminal $88_6$, the NAND gate 108 connects to the output terminal $88_7$, and the NAND gates 109 and 110 connect to the output terminal $88_8$. The NAND gates 100, 101 and 110 each have a second input terminal connected to the Q terminal 97 on the J-K flip-flop 93 and the NAND gate 100 has a third input connected to a Q output terminal 111 on a first R-S flip-flop 112. A second input terminal on each of the NAND gates 102-109 connects to an edit bus 115, which in turn connects to the output of an edit NAND gate 116. A first input terminal 117 on the edit NAND gate 116 connects to the $\bar{Q}$ output terminal 98 on the J-K flip-flop 93 and a second input terminal 118 connects to a flip-flop to be described below. A third input terminal on the NAND gate 110 connects to the output of an inverter gate 99, the input of which connects to the address comparator output 42. The first R-S flip-flop 112 is a commercially available integrated circuit which is set to generate a logic high voltage at its Q output terminal 11 when a logic low is applied to an S input terminal 113. It is reset to generate a logic low voltage at the Q output terminal 11 when a logic low voltage is applied to an R input terminal 114.

Referring to FIGS. 1 and 2, the output of the NAND gate 100 connects to the data clear input terminal 31 on the memory address counter 28, the output of the NAND gate 101 connects to the down-count input terminal 30 on the memory address counter 28, the output of the NAND gate 102 connects to the R terminal 114 on the first R-S flip-flop 112, the output of the NAND gate 103 connects to an R input terminal 120 on a second R-S flip-flop 121, the output of the NAND gate 104 connects to the second storage enable terminal 71, the output of the NAND gate 105 connects to the memory cycle initiate terminal 6, the output of the NAND gate 106 connects to an S input terminal 122 on the R-S flip-flop 121, the output of the NAND gate 107 connects to the first storage enable terminal 67, the output of the NAND gate 108 connects to the memory cycle initiate terminal 6, the output of the NAND gate 109 connects to the R input terminal 120 on the second R-S flip-flop 121, and the output of the NAND gate 110 connects to the S input terminal 113 on the first R-S flip-flop 112. The output of the NAND gate 110 also connects to an input terminal 123 on a monoshot circuit 124, and a $\bar{Q}$ output terminal 125 on the monoshot 124 connects to a clear input terminal 126 on the J-K flip-flop 93. And finally, a Q output terminal 127 on the second R-S flip-flop 121 connects to the memory R/W select terminal 3 on the read-write memory 1.

When the pushbutton switch 90 is closed, the J-K flip-flop 93 is set and the NAND gates 100-110 are enabled. The first R-S flip-flop 112 is set and the second R-S flip-flop 121 is reset. The eight-phase clock 76 is enabled and when a clock pulse is generated at the output terminal $88_2$, the NAND gate 100 is gated and a logic low voltage is generated to clear, or reset, the memory address counter 28 to zero. When the fourth clock pulse is generated, the NAND gate 101 is gated to decrement or count down the memory address counter 28 by one count and to thereby address the last line in the read-write memory 1. The NAND gate 102 is also gated to reset the first R-S flip-flop 112 and to thereby disable the NAND gate 100 on subsequent cycles. The NAND gate 103 is also gated to reset the R-S flip-flop 121 and to thereby prepare the read-write memory 1 to read out an addressed instruction. Although the NAND gate 104 is also gated to clock the second temporary storage 70, during the first cycle there is no instruction in the first temporary storage 63 and, therefore, nothing is stored. When a clock pulse is generated at the output terminal $88_5$, the NAND gate 105 is gated and the read-write memory 1 is enabled to read out the addressed instruction. On the sixth clock pulse the NAND gate 107 is gated and the first temporary storage 63 is clocked to receive and store this instruction. Simultaneously, the R-S flip-flop 21 is set to connect the data cable 16 with the data input bus 19 and the NAND gate 106 is gated to set the second R-S flip-flop 121 to prepare the read-write memory 1 to load an instruction. On the seventh clock pulse, the NAND gate 108 is gated and read-write memory 1 is enabled to load an instruction from the second temporary storage 70. No instruction is contained in the storage 70 during the first cycle and zeros are written into the last line of the read-write memory 1. On the eighth clock pulse, the NAND gate 109 is enabled to reset the second R-S flip-flop 121 to prepare the read-write memory 1 to read out an addressed instruction, and the NAND gate 110 is enabled but not gated.

During the second and subsequent cycles of the eight-phase clock pulse generator 76, the memory address counter 28 is decremented one count by the NAND gate 101, the instruction stored in the first temporary storage 63 is transferred to the second temporary storage 70 by the NAND gate 104, the instruction on the newly addressed line is read out by the NAND gate 105 and stored in the first temporary storage 63 by the NAND gate 107. The instruction in the second temporary storage 70 is then loaded into the addressed line of the read-write memory 1 by the operation of the NAND gate 108. The cycle repeats until a logic low voltage is generated at the address comparator output terminal 42. When this occurs, the NAND gate 110 is gated on the eighth clock pulse to generate a logic low voltage to the monoshot circuit 124. A logic low voltage pulse is thus generated at $\overline{Q}$ output terminal 125 to reset the J-K flip-flop 93 and to thereby disable the eight-phase clock 76. Each instruction of the program, starting from the end of the program (highest memory address) and continuing to the instruction which follows the gap to be closed, is shifted one line in the memory to close the gap.

Figure 3:
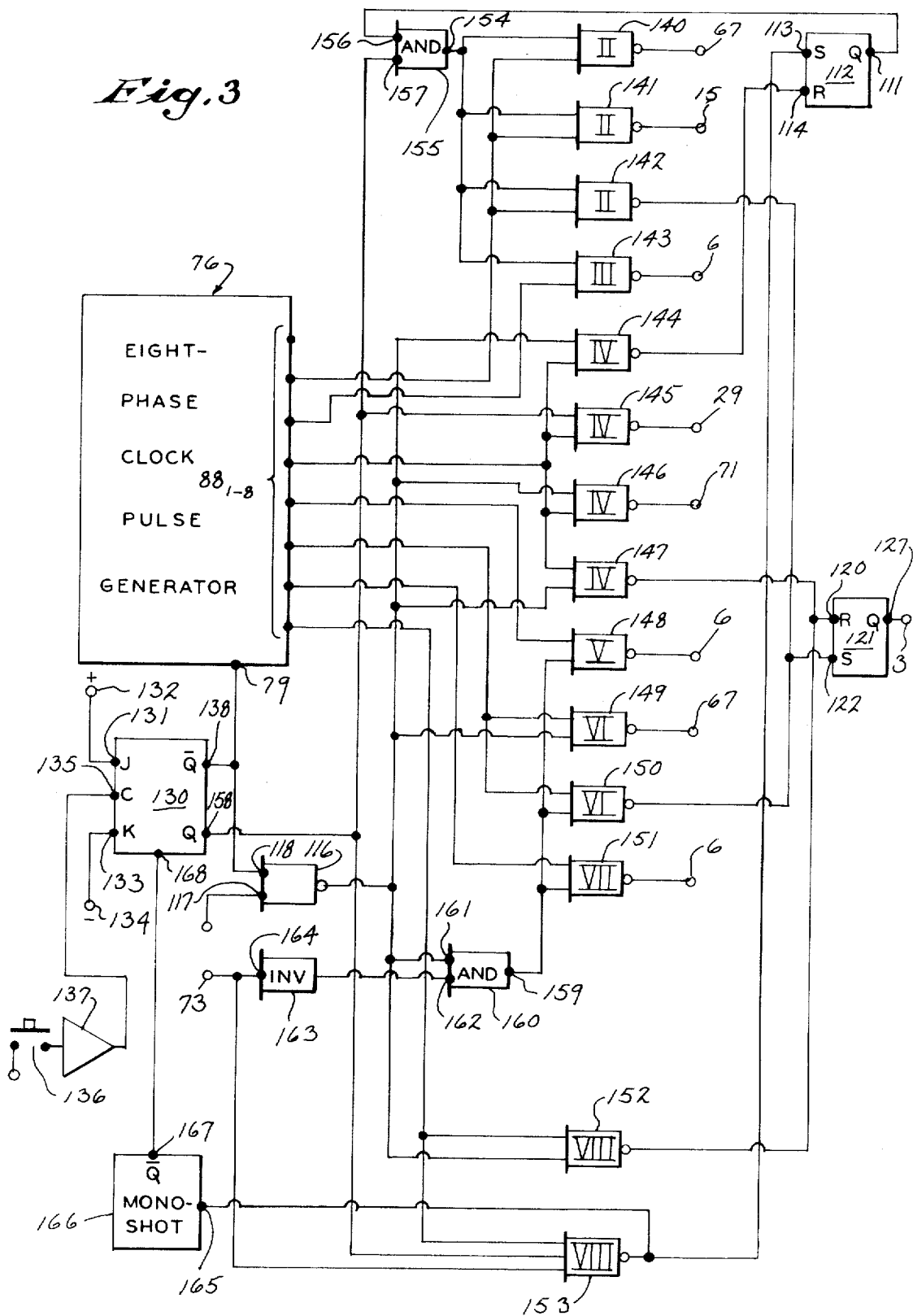
FIG. 3 is an electrical schematic diagram of that portion of the central control which is relevant to the OPEN GAP mode of operation.
Figure 1:
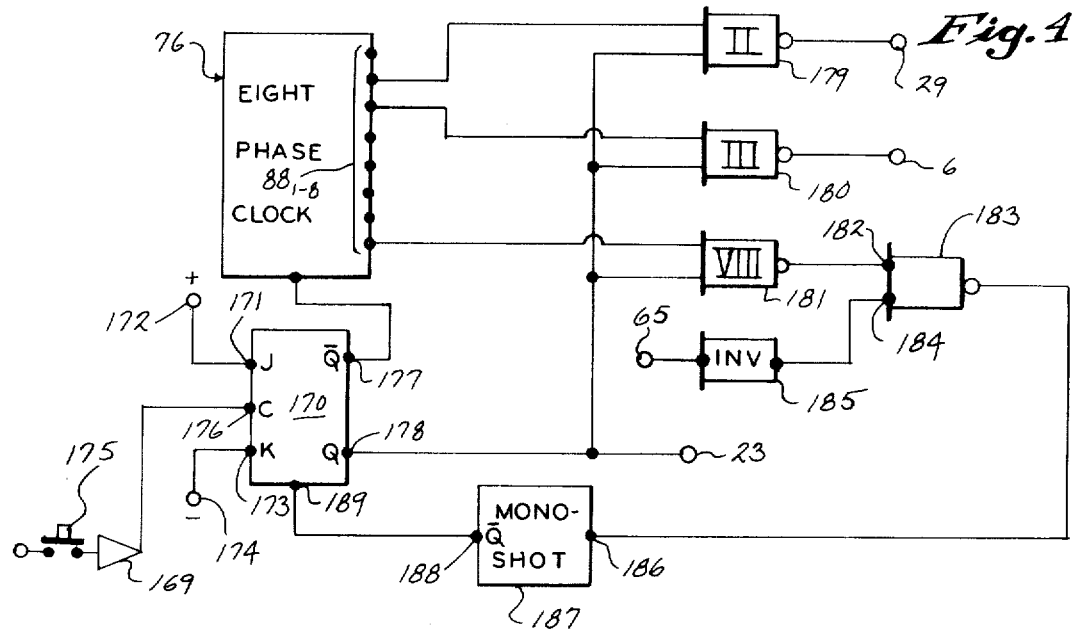

Referring to FIG. 3, that portion of the control circuit 75 which relates to the GAP operation includes many of the elements used to perform the UNGAP operation discussed above. For example, the eight-phase clock pulse generator 76 is used, as well as the first and second R-S flip-flops 112 and 121 and the edit NAND gate 116. It also includes a second J-K flip-flop 130 having a J input terminal 131 connected to a positive supply terminal 132 and a K terminal 133 connected to a negative supply terminal 134. A clock terminal 135 on the second J-K flip-flop 130 is connected to a gap pushbutton 136 through a buffer circuit 137 and a $\overline{Q}$ output terminal 138 connects to the second input terminal 118 on the edit NAND gate 116 and to the enable terminal 79 on the eight-phase clock 76.

The gap circuitry also includes a set of 14 NAND gates 140-153 each having an input terminal connected to one of the output terminals $88_{1-8}$ of the eight-phase clock pulse generator 76. As in FIG. 2, each NAND gate 140-153 is also designated with a Roman Numeral which indicates the particular clock terminal to which it is attached. More specifically, an input terminal on the three NAND gates 140-142 is connected to clock output terminal $88_2$, NAND gate 143 is connected to clock output terminal $88_3$ the four NAND gates 144-147 are connected to the clock output terminal $88_4$, the NAND gate 148 is connected to the clock output terminal $88_5$, the two NAND gates 149 and 150 are connected to the clock output terminal $88_6$, the NAND gate 151 is connected to the clock output terminal $88_7$, and the two NAND gates 152 and 153 are connected to the clock output terminal $88_8$. A second input terminal on each of the NAND gates 140-143 connects to an output terminal 154 on an initialization AND gate 155. A first input terminal 156 on the initialization AND gate 155 connects to the Q output terminal 111 on the first R-S flip-flop 112, and its second input terminal 157 connects to a Q output terminal 158 on the second J-K flip-flop 130. A second input terminal on the NAND gates 145 and 153 also connect to the Q output terminal 158. A second input terminal on each of the NAND gates 144, 146, 147, 149 and 152 connect to the edit bus 115, and a second input terminal on each of the NAND gates 148, 150 and 151 connect to an output terminal 159 on a termination AND gate 160. A first input terminal 161 on the termination AND gate 160 connects to the edit bus 115 and a second input terminal 162 connects to the output of an inverter gate 163. An input terminal 164 on the inverter gate 163 connects to the memory address counter output terminal 73 and to a third input terminal on the NAND gate 153.

The GAP operation is initiated by depressing the gap pushbutton 36 to set the second J-K flip-flop 130. The eight-phase clock pulse generator 76 is thus enabled by the logic low voltage generated at the $\overline{Q}$ output terminal 138 and the initialization AND gate 155 is gated by the logic high voltage generated at the Q output terminal 158. As a result of the logic low at the Q output terminal 138, a logic high voltage is generated on the edit bus 115 which enables the NAND gates 144, 146, 147, 149 and 152, and the termination AND gate 160. A logic low voltage is generated at the memory address counter output terminal 73 during the GAP operation, and as a result, the NAND gate 153 is disabled and the NAND gates 148, 150 and 151 are enabled by the termination AND gate 160. Thus, at the beginning of the first cycle of the eight-phase clock pulse generator 76, the NAND gates 140-152 are enabled to be gated by the generated clock pulses. The output terminal of the NAND gate 144 is connected to the R input terminal 114 on the first R-S flip-flop 112, and when gated during the first clock cycle, the R-S flip-flop 112 is reset to generate a logic low voltage to the input terminal 156 on the initialization AND gate 155. As a result, during subsequent cycles of the eight-phase clock pulse generator 76, the first four NAND gates 140–143 are disabled.

Referring to FIGS. 1 and 3, the output terminals of the NAND gates 150–153 are connected to the elements shown in FIG. 1 to provide the GAP mode of operation. More specifically, the output of the NAND gate 140 connects to the first storage enable terminal 67, the output of the NAND gate 141 connects to the clear terminal 15 on the data input selector 13 and the output of the NAND gate 142 connects to the S input terminal 122 on the second R-S flip-flop 121. The output terminal of the NAND gate 143 connects to the memory cycle initiate terminal 6, the output terminal on the NAND gate 145 connects to the up-count input terminal 29 on the memory address counter 28, the output terminal of the NAND gate 146 connects to the second storage enable terminal 71 on the second temporary storage 70, and the output terminal of the NAND gate 147 connects to the R input terminal 120 on the second R-S flip-flop 121. The output terminal of the NAND gate 148 connects to the memory cycle initiate terminal 6, the output terminal of the NAND gate 149 connects to the first storage enable terminal 67, the output of the NAND gate 150 connects to the S terminal 122 on the second R-S flip-flop 121. And finally, the output terminal of the NAND gate 152 connects to the R input terminal 120 on the second R-S flip-flop 121, and the output terminal of the NAND gate 153 connects to both the S input terminal 113 on the first R-S flip-flop 112 and to an input terminal 165 on a second monoshot circuit 166. A $\overline{Q}$ output terminal 167 on the monoshot circuit 166 connects to a clear terminal 168 on the second J-K flip-flop 130.

During the first cycle of the GAP operation, the first four NAND gates 140–143 initialize the program loader. The memory address at which the gap is to be formed is first inserted at the memory address input circuit 37 and the instruction on that line in the read-write memory 1 is read out to the memory data output bus 53. The NAND gate 140 is gated to operate the first temporary storage 63 and the instruction is stored. The NAND gate 141 is then gated to clear, or set the data input selector 13 to zero, and the NAND gate 142 is gated to set the second R-S flip-flop 121 to thereby prepare the read-write memory 1 to load a word. On the next clock pulse, the NAND gate 143 is clocked and the read-write memory 1 is enabled to write zeros on the addressed line. A gap is thus created. The next clock pulse gates the NAND gate 144 to reset the first R-S flip-flop 112 and to thereby disable the initialization AND gate 155 during subsequent cycles.

During subsequent events the NAND gate 145 gates to increment the memory address counter 28, and the NAND gate 146 is gated to transfer the instruction contained in the first temporary storage 63 to the second temporary storage 70. The NAND gate 147 is also gated to reset the second R-S flip-flop 121 to prepare the read-write memory 1 to read the next instruction. On the fifth clock pulse the NAND gate 148 is clocked and the read-write memory 1 is enabled to read out the instruction on the addressed line. The NAND gate 149 is gated next to store the instruction in the first temporary storage 63, and the NAND gate 150 is gated to set the second R-S flip-flop 121 to prepare the read-write memory 1 to load. On the seventh clock pulse, the NAND gate 151 is gated and the instruction stored in the second temporary storage 70 is loaded into the read-write memory 1. The eighth clock pulse gates the NAND gate 152 to reset the second R-S flip-flop 121. The cycle then repeats, removing each subsequent instruction from the read-write memory 1 and substituting for it the instruction from the previous memory address. When the memory address counter 28 has counted to its capacity, a carry pulse, or logic high voltage, is generated at its output terminal 73 to disable the termination AND gate 60 and to thereby disable the four NAND gates 148–151 during the final clock cycle. The NAND gate 153, however, is enabled during the final clock cycle and on the eight clock pulse the NAND gate 153 is gated to set the first R-S flip-flop 112 and to clock the monoshot circuit 166. A logic low voltage is generated at the monoshot $\overline{Q}$ output terminal 167 and the second J-K flip-flop 130 is reset to disable the eight-phase clock pulse generator 76.

Referring to FIGS. 1 and 4, that portion of the control circuit 75 which relates to the SEARCH mode of operation connects to the eight-phase clock pulse generator 76 and includes a third J-K flip-flop 170 which has a J input terminal 171 connected to a positive supply terminal 172 and a K input terminal 173 connected to a negative supply terminal 174. A search pushbutton 175 connects through a buffer 169 to a clock input terminal 176 on the J-K flip-flop 170. A $\overline{Q}$ output terminal 177 connects to the clock enable terminal 79 and a Q output terminal 178 connects to the R input terminal 23 on the R-S flip-flop 21. The Q output terminal 178 also connects to the input terminal on a first NAND gate 179, to the input terminal on a second NAND gate 180 and to the input terminal on an AND gate 181. A second input terminal on the first NAND gate 179 connects to the second clock pulse generator output terminal $88_2$, a second input terminal on the second NAND gate 180 connects to the clock pulse generator output terminal $88_3$ and a second input terminal on the AND gate 181 connects to the clock pulse generator output terminal $88_8$. The output of the first NAND gate 179 connects to the up-count input terminal 29 on the memory address counter 28, and the output of the second NAND gate 180 connects to the memory cycle initiate terminal 6 on the read-write memory 1. The output of the AND gate 181 connects to a first input terminal 182 on a third NAND gate 183 and a second input terminal 184 on the NAND gate 183 connects to the comparator output terminal 65 through an inverter gate 185. The output of the third NAND gate 183 connects to an input terminal 186 on a monoshot circuit 187 and a $\overline{Q}$ output terminal 188 on the monoshot circuit 187 connects to a clear terminal 189 on the third J-K flip-flop 170.

When the search pushbutton 175 is operated, the third J-K flip-flop 170 is set and a logic low voltage is generated at the $\overline{Q}$ output terminal 177 to enable the eight-phase clock pulse generator 76. Simultaneously, a logic high voltage is generated at the Q output terminal 178 to reset the R-S flip-flop 21 and to thereby enable the data input selector 13 to receive an instruction from the input circuit 7 through the cable 10. In the SEARCH mode, a particular instruction contained in the stored program is to be located and its memory address displayed on the memory address display 44. The instruction to be located is inserted at the input circuit 7 and is applied through the data input selector 13 to the second set of input terminals 64 on the comparator circuit 61. The control circuit 75 operates to sequentially read out each instruction in the read-write memory 1 and apply each to the first set of comparator input terminals 60. When the instruction is located, a logic low voltage is generated at the comparator output terminal 65 and the SEARCH operation terminates.

More specifically, the second clock pulse generated by the eight-phase clock pulse generator 76 gates the first NAND gate 179 and the memory address counter 28 is incremented to address the next line in the read-write memory 1. The third clock pulse gates the second NAND gate 180 and the read-write memory 1 is enabled to read out the instruction stored on the newly addressed line to the comparator 61. Comparison is made and the eighth clock pulse gates the AND gate 181 to enable the third NAND gate 183. If identity is found, the comparator 61 generates a logic low voltage at its output terminal 65 and the third NAND gate 183 is gated to clock the monoshot circuit 187. As a result, the third J-K flip-flop 170 is reset and the eight-phase clock pulse generator 76 is disabled. If identity is not established, however, the eight-phase clock pulse generator 76 continues to cycle and increment the memory address counter 28 and sequentially read each instruction stored in the read-write memory 1.

Figure 5:
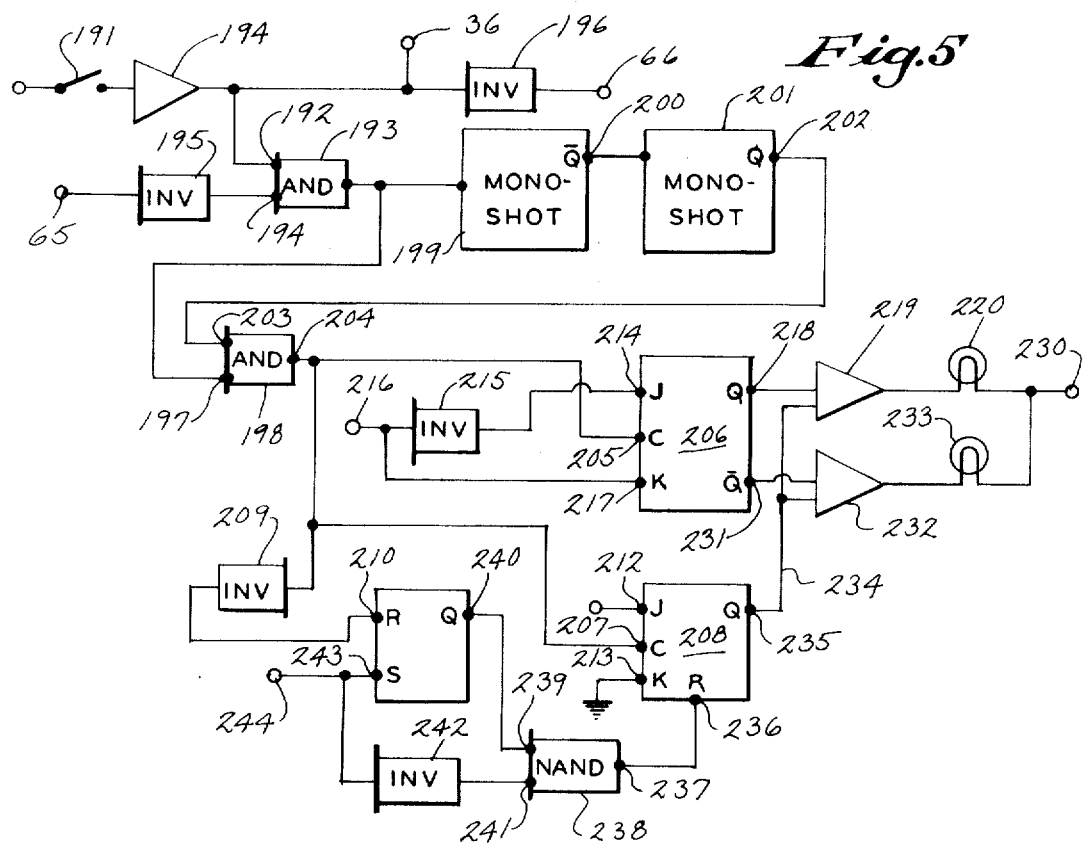
FIG. 5 is an electrical schematic diagram of that portion of the central control relating to the MONITOR mode of operation.

Referring to FIGS. 1 and 5, that portion of the control circuit 75 which relates to the MONITOR mode of operation includes a run switch 191 connected to a first input terminal 192 on an input AND gate 193 through a buffer circuit 194. A second input terminal 194 on the input AND gate 193 connects to the output of an inverter gate 195, the input of which connects to the comparator output terminal 65. The output of the input AND gate 193 connects to the address sequencer enable terminal 36 and connects through an inverter gate 196 to the OP disable terminal 66 on the comparator circuit 61. It also connects to a first input terminal 197 on an AND gate 198 and to the input of a first monoshot circuit 199. A $\bar{Q}$ output terminal 200 on the first monoshot 199 connects to the input of a second monoshot circuit 201, and a Q output terminal 202 on the monoshot 201 connects to a second input terminal 203 on the AND gate 198. An output terminal 204 on the AND gate 198 connects to a clock terminal 205 on a first J-K flip-flop 206 and to a clock terminal 207 on a second J-K flip-flop 208. The output terminal 204 also connects through an inverter gate 209 to a reset terminal 210 on an R-S flip-flop 211. A J input terminal 212 on the second J-K flip-flop 208 connects to a logic high voltage source and a K input terminal 213 connects to a signal ground. A J input terminal 214 on the first J-K flip-flop 206 connects to the output of an inverter gate 215, the input of which connects to a logic input bus 216 on the programmable controller 58 and a K input terminal 217 connects directly to the logic input bus 216. A Q output terminal 218 on the flip-flop 206 connects through a first buffer circuit 219 to one lead of an indicator light 220, and a second lead on the light 220 connects to a positive supply terminal 230. A $\bar{Q}$ output terminal 231 on the flip-flop 206 connects through a second buffer circuit 232 to one lead of a second indicator light 233, and a second lead on the light 233 connects to the supply terminal 230. An inhibit terminal on each of the buffer circuits 219 and 232 connects through a line 234 to a Q output terminal 235 on the second J-K flip-flop 208. A reset terminal 236 on the second J-K flip-flop 208 connects to an output terminal 237 on a NAND gate 238. A first input terminal 239 on the NAND gate 238 connects to a Q output 240 on the R-S flip-flop 211 and a second NAND gate input terminal 241 connects to the output of an inverter gate 242. The input of the inverter gate 242 connects to a set terminal 243 on the flip-flop 211 and the set terminal 243 connects to a memory reset terminal 244 on the address sequencer 35.

Referring to FIGS. 1 and 5, during the MONITOR mode of operation, the run switch 191 is closed and the programmable controller is operated at its normal rate by the address sequencer 35. The I/O address of a particular input or output device to be monitored is manually selected at the input circuit 7 and applied through the data input selector 13 to the input terminals 64 of the comparator circuit 61. A comparison is thus made between the selected I/O address and the I/O address in each instruction read from the read-write memory 1. When identity is found, a logic low voltage is generated at the comparator output terminal 65 and is applied through the inverter gate 195 to the input AND gate 193. The resulting logic high voltage at the AND gate output terminal is applied to the input terminal 197 on the AND gate 198 and is applied to clock the first monoshot circuit 199. The first monoshot circuit 204 in turn clocks the second monoshot circuit 206 which generates a time-delayed, logic high voltage pulse to the input terminal 203 on the AND gate 198. The AND gate 198 is therefore gated each time the monitored device is addressed by an instruction read from the read-write memory 1.

Each time the monitored device is addressed, the J-K flip-flops 206 and 208 are clocked. The second J-K flip-flop 208 is thus set, and a logic high voltage is generated at its Q output terminal 235 to enable the buffers 219 and 232. On the other hand, the first J-K flip-flop 206 is either set or reset depending upon the state of the logic input bus 216 in the programmable controller 58. The logic state of the bus 216 indicates the condition (open or closed, energized or deenergized) of the monitored input or output device and this condition is stored by the first J-K flip-flop 206. Reference is made to the above cited copending patent application Ser. No. 137,923 for more detailed description of the manner in which the logic input bus 216 functions. If the monitored device is closed, or energized, a logic high voltage is generated to the J input terminal 214 of the J-K flip-flop 206 and it is set to generate a logic high voltage at its Q output terminal 218 which energizes the first indicator light 220. On the other hand, when the monitored device is open, or deenergized, the logic high voltage is applied to the K input terminal 217 and the J-K flip-flop 206 is reset to energize the second indicator light 233.

Under normal circumstances, an existing I/O address is properly entered by the operator and the status of the associated input or output device is indicated by one of the lights 220 or 233. However, if an error is made in entering the I/O address, the R-S flip-flop 211 operates to reset the second J-K flip-flop 208 and thus disable both indicator lights 220 and 233. More specifically, after each cycle of the address sequencer 35 a logic low voltage is generated at its memory reset terminal 244 to set the R-S flip-flop 211. If during the subsequent cycle through the program stored in the read-write memory 1 the selected I/O address is not read, the R-S flip-flop 211 remains set and a logic high voltage is generated at its Q output terminal 240. As a result, at the end of the cycle the memory reset pulse is gated through the NAND gate 238 to reset the second J-K flip-flop 208. The J-K flip-flop 208 remains reset and the indicator lights 220 and 233 remain off until a logic high voltage is generated at the AND gate output terminal 204 indicating that the selected I/O address has been read from the read-write memory 1.

The program loader shown in FIG. 1 has additional modes of operation, and more specifically includes a TRANSFER mode of operation in which a program stored in the read-write memory 1 is transferred to a read-only memory 221. Such a transfer is performed after the program stored in the read-write memory 1 has been fully tested and edited. A plug (not shown in the drawings) is attached to the program loader and is adapted to receive the read-only memory 221. The plug is connected to the leads in the memory address cable 26, connected to the leads in a cable 222, and connected to the leads in a second cable 223. The cable 222 connects with the input terminals 51 on the data output selector 49 and the cable 223 connects with output terminals 224 on a transfer circuit 225. A set of input terminals 226 on the transfer circuit 225 connect with the leads in the memory data input bus 19. In the TRANSFER mode of operation, each instruction is read from the read-write memory and transferred through the input data selector 13 to the read-only memory 221. Each is applied through the transfer circuit 225 which operates to sequentially "burn" or "fuse" the memory elements on an addressed line of the read-only memory 221. The transfer circuit 225 and the manner in which a program is transferred from the read-write memory 1 to a read-only memory 221 is fully disclosed in the above cited copending patent application Ser. No. 179,982.

We claim:

1. In a program loader for a programmable controller having a read-write memory which stores at a set of memory locations instructions that comprise a controller program, the combination comprising:
   a first temporary storage connected to said read-write memory to receive and store an instruction read from an addressed memory location in said read-write memory;
   a second temporary storage connected to receive and store an instruction read from said read-write memory;
   a memory address counter connected to said read-write memory to selectively address memory locations therein; and
   a control circuit which includes first means connected to said read-write memory and said memory address counter to sequentially read out of memory each instruction in said set to said first and second temporary storages, and second means connected to said read-write memory and said first and second temporary storages to sequentially load each instruction stored in said first and second temporary storages back into said read-write memory at a different memory location.

2. The program loader as recited in claim 1 which includes:
   an input circuit operable to generate a manually selected I/O address;
   a comparator circuit having a first set of input terminals connected to said read-write memory to receive the I/O address in each of the instructions read therefrom, a second set of input terminals connected to said input circuit to receive the I/O address generated thereby, and an output terminal; and
   a flip-flop having a first input terminal connected to a logic input bus in the programmable controller to which the program loader is connected, and a second input terminal connected to said comparator circuit output terminal,
   wherein the comparator circuit is operable to change the logic state of its output terminal when the I/O addresses applied to its first and second input terminal sets are identical and said flip-flop is operable to store the logic condition of said logic input bus when the comparator output changes logic state.

3. The program loader as recited in claim 2 in which an indicator light is connected to said flip-flop to provide visual indication of the stored logic state.

4. In a program loader for a programmable controller having a read-write memory which stores at a set of memory locations instructions that comprise a controller program, the combination comprising:
   a first temporary storage connected to said read-write memory to receive and store an instruction read from an addressed memory location in said read-write memory;
   a second temporary storage connected to receive and store an instruction read from said read-write memory;
   a memory address counter connected to said read-write memory to selectively address memory locations therein;
   an input circuit operable to generate a manually selected instruction;
   a memory address display connected to said memory address counter;
   a comparator circuit having a first set of input terminals connected to said read-write memory, a second set of input terminals connected to said input circuit to receive an instruction from said input circuit, and an output terminal, said comparator circuit being operable to generate a first logic state at its output terminal when the instructions applied to its first and second input terminal sets are identical, and to generate a second logic state at its output terminal when the instructions applied to its first and second input terminal sets differ;
   a control circuit connected to said first and second temporary storages, said comparator circuit output terminal, and said memory address counter, said control circuit being operable in a first mode to shift the memory location of a set of said instructions by sequentially reading out of memory each instruction in said set, storing each in one of said temporary storages, and loading each back into said read-write memory at a different memory location, and
   wherein said control circuit is operable in a second mode in which it is responsive to said second logic state generated at said comparator output terminal to repeatedly increment said memory address counter and to thereby read successive instructions of said controller program out of said read-write memory to said comparator circuit, and said control circuit is responsive to said first logic state generated at said comparator output terminal to stop incrementing said memory address counter.

5. In a program loader for a programmable controller having a read-write memory which stores at memory locations instructions that comprise a controller program, a method of shifting the memory location of a set of said instructions, the steps comprising:
1. reading an instruction in said set to be shifted out of a selected memory location and storing it in a first temporary storage;
2. incrementing a memory address counter to address another memory location;
3. transferring said instructions stored in said first temporary storage to a second temporary storage;
4. reading the instruction out of said other memory location and storing it in said first temporary storage;
5. loading said instruction in said second temporary storage into said read-write memory at said other memory location; and
6. repeating steps 2, 3, 4 and 5 until said entire set of instructions has been shifted.

6. In a program loader having means for loading the instructions of a controller program into a read-write memory of a programmable controller, the improvement comprising first editing means for shifting the memory location of a set of said controller program instructions, said first editing means including:
a memory address counter having an address input terminal and an output terminal, said memory address counter output terminal being connectable to the address terminals on said read-write memory and said memory address counter being operable when enabled to sequentially address the memory locations of controller program instructions;
a memory address input circuit connected to said address input terminal on said memory address counter to address a selected memory location;
a first temporary storage having an output terminal and an input terminal, said input terminal being connectable to a data output terminal on said read-write memory to receive the controller program instructions read therefrom; and
a second temporary storage having an input terminal connected to the output terminal of said first temporary storage to receive a controller program instruction therefrom and an output terminal connectable to the data input terminal on said read-write memory to load a controller program instruction into an addressed memory location in said read-write memory;
wherein said first editing means is operable to sequentially shift the memory location of each instruction in said set of controller program instructions by leading each out of said read-write memory to said first temporary storage, transferring each to said second temporary storage, and then loading each back into said read-write memory at a different memory location.

7. A program loader as recited in claim 6 which includes second editing means for indicating the memory location of a selected controller program instruction, said second editing means including:
an input circuit adapted to generate said selected controller program instruction at an output terminal;
a comparator circuit having a first input terminal connectable to receive the controller program instructions read out of said read-write memory and a second input terminal connected to said input circuit output terminal to receive said selected controller program instruction; and
a memory address display circuit connected to the address input terminal of said read-write memory and being operable to display the identity of the memory location being addressed by said memory address counter when the controller program instruction applied to the first comparator input terminal is identical to said selected controller program instruction applied to the second comparator input terminal.

8. The program loader as recited in claim 7 which includes an address comparator having a first input terminal connected to the output of said memory address counter and a second input terminal connected to the output of said memory address input circuit, said address comparator being operable to disable said memory address counter when the memory address generated thereby is identical to that generated by said memory address input circuit.

9. The program loader as recited in claim 8 which includes a data input selector having a first input terminal connected to said input circuit output terminal, a second input terminal connected to the output terminal on said second temporary storage and an output terminal connectable to said read-write memory data input terminal.

10. The program loader as recited in claim 9 in which the editing functions are controlled by a polyphase clock pulse generator having a plurality of output terminals and a set of logic gates each logic gate having an input terminal connected to one of said clock pulse generator output terminals, and in which selected logic gate output terminals connect to said first temporary storage, said second temporary storage, said memory address counter and said comparator circuit.

* * * * *

UNITED STATES PATENT OFFICE
CERTIFICATE OF CORRECTION

Patent No. 3,813,649      Dated May 28, 1974

Inventor(s) Odo J. Struger et al

It is certified that error appears in the above-identified patent and that said Letters Patent are hereby corrected as shown below:

| | |
|---|---|
| Column 1, line 27 | after "rect" insert -- the -- |
| Column 4, line 38 | "either" should be -- eight -- |
| Column 5, line 35 | "selected" should be -- selecting -- |
| Column 9, line 36 | "termianls" should be -- terminals -- |
| Column 15, line 55 | delete "a", first occurrence |

Signed and sealed this 17th day of September 1974.

(SEAL)
Attest:

McCOY M. GIBSON JR.      C. MARSHALL DANN
Attesting Officer      Commissioner of Patents